United States Patent
Lee

(10) Patent No.: US 6,629,240 B1
(45) Date of Patent: Sep. 30, 2003

(54) METHOD FOR MONITORING SYSTEM BOOT BY SEARCHING A TEMPORARY BUFFER FOR BIOS MESSAGE

(75) Inventor: Jun-Hyuk Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/468,099

(22) Filed: Dec. 21, 1999

(30) Foreign Application Priority Data

Dec. 22, 1998 (KR) .............................. 98-57381

(51) Int. Cl.⁷ ........................ G06F 9/445; G06F 15/177
(52) U.S. Cl. ............................................. 713/2; 713/1
(58) Field of Search .................... 713/2, 1; 345/530

(56) References Cited

U.S. PATENT DOCUMENTS

| | | | | |
|---|---|---|---|---|
| 5,043,919 A | * | 8/1991 | Callaway et al. ............ 345/733 |
| 5,257,384 A | * | 10/1993 | Farrand et al. .............. 710/105 |
| 5,367,670 A | | 11/1994 | Ward et al. |
| 5,367,674 A | * | 11/1994 | Berk et al. .................. 708/203 |
| 5,379,429 A | * | 1/1995 | Hirasawa et al. ............ 717/170 |
| 5,420,965 A | * | 5/1995 | Barker, III .................. 358/1.15 |
| 5,471,617 A | | 11/1995 | Farrand et al. |
| 5,483,633 A | * | 1/1996 | Johnson ....................... 345/764 |
| 5,485,569 A | * | 1/1996 | Goldman et al. ............ 715/507 |
| 5,852,720 A | | 12/1998 | Gready et al. |
| 5,920,691 A | * | 7/1999 | Tsutsui et al. .............. 709/201 |
| 5,996,072 A | * | 11/1999 | Noll et al. ...................... 713/1 |
| 6,357,002 B1 | * | 3/2002 | Lupo et al. ..................... 713/1 |
| 6,476,854 B1 | * | 11/2002 | Emerson et al. ............ 348/143 |

\* cited by examiner

*Primary Examiner*—Thomas Lee
*Assistant Examiner*—Eric Chang
(74) *Attorney, Agent, or Firm*—Robert E. Bushnell, Esq.

(57) ABSTRACT

The present invention relates to a method for monitoring a system by searching a screen buffer, more particularly, for a system management board to detect screen messages output when a system boots and to inform a remote system manager of the booting status and the abnormality of the system. The method according to the present invention comprises steps of: reproducing the data of a screen buffer of video RAM area into a temporary buffer in a program; searching for specific BIOS messages in the temporary buffer reproduced from the screen buffer; and reporting the search result to a remote system manager.

14 Claims, 4 Drawing Sheets

| SIZE | MEMORY ADDRESS | SYSTEM FUNCTION |
|---|---|---|
| 64KB | 000F0000h~000FFFFFh | SYSTEM ROM |
| 64KB | 000E0000h~000EFFFFh | UNUSED |
| 96KB | 000C8000h~000DFFFFh | UNUSED |
| 6KB | 000C6800h~000C7FFFh | VIDEO ROM |
| 2KB | 0006C000h~000C67FFh | UNUSED |
| 24KB | 000C0000h~000C5FFFh | VIDEO ROM |
| 128KB | 000A0000h~000BFFFFh | VIDEO ROM |
| 640KB | 00000000h~0009FFFFh | BASE MEMORY |

*FIG. 1*

METHOD FOR MONITORING SYSTEM BOOT BY SEARCHING A TEMPORARY BUFFER FOR BIOS MESSAGE

CLAIM OF PRIORITY

This application makes reference to, incorporates the same herein, and claims all benefits accruing under 35 U.S.C §119 from an application entitled Method For Monitoring System By Searching Screen Buffer earlier filed in the Korean Industrial Property Office on Dec. 22, 1998, and there duly assigned Serial No. 98-57381 by that Office.

BACKGROUND OF THE INVENTION

1 Field of the Invention

The present invention relates to a method for monitoring a system by searching a screen buffer, and more particularly, for detecting screen messages generated during a boot operation when the system is powered on or reset and then using the generated messages to determine the booting status and any abnormality of the system which is then reported to a remote system manager by using a server management board.

2 Description of the Background Art

In the case of an IBM PC compatible computer, a basic input/output system(hereinafter referred to as BIOS) performs the whole initialization and test of a system when the system is turned on. This test is usually referred to a Power On SelfTest(hereinafter referred to as POST). At the time of an operation of a POST, a BIOS outputs values from each step of the POST to certain input/output addresses. An input/output address is usually referred to as I/O port, and differs with respect to the BIOS and a system bus, e.g., for an ISA (Industry Standard Architecture) bus, an I/O address is 0X80; for an EISA (Extended Industry Standard Architecture) bus, an I/O address is 0X300.

A POST code is used at the early development of a system and a BIOS, and thereafter used for managing the system. In order to use the POST code, an I/O port which outputs the POST code is connected to a substantial device (a kind of buffer), and then either a program or a hardware using the POST code reads and uses values stored in the device.

Above described systems are degraded in compatibility. The reasons for failing to be compatible are as follows:

A. Since an I/O port differs according to a system bus, the configuration of different hardware logic is required in a server management board operated at each system bus;

B. A POST code can not be acquired in a server management board having no specially designed hardware logic;

C. An I/O port which can be applied to a PCI bus is not supported; and

D. A POST code is simply output as a hexadecimal value of one byte (0x00~0xFF) so that the meaning of each code cannot be recognized at once. Also, each code and its meaning are different according to a BIOS manufacturer.

Deterioration in compatibility caused by the above mentioned situations is a main cause of failure in commonality and compatibility, and is an obstacle in manufacturing a server management board applicable to a plurality of platforms.

Of interest to the present invention, and incorporated herein, are U.S. Pat. No. 5,852,720 to R. Scott Gready et al. entitled System For Storing Display Data During First Time Period Prior To Failure Of Computer And During Second Time Period After Reset Of The Computer which discusses a communication system where sequences of video screens sent from a host CPU (central processing system) to a video controller can be stored and subsequently retrieved by a terminal located remote from the host CPU; U.S. Pat. No. 5,471,617 to Scott C. Farrand et al. entitled Computer Management System And Associated Management Information Base and U.S. Pat. No. 5,367,670 to Ronald G. Ward et al. entitled Computer System Manager For Monitoring Events And Operating Parameters And Generating Alerts, both of which discuss and describe a "server management board" used in network communication systems; U.S. Pat. No. 5,257,384 to Scott C. Farrand et al. entitled Asynchronous Protocol For Computer System Manager which discloses a protocol for communicating messages between a system manager for a computer system and a remote facility; and U.S. Pat. No. 5,043,919 to Janet R. Callaway et al. entitled Method of And System For Updating A Display Unit which discloses that in personal computer-based systems, each personal computer includes a screen buffer which can be directly written to by a BIOS program associated with the respective personal computer or an application program being executed on the computer, and a technique for monitoring dynamically changing host computer screen activity and transmitting the screen updates to a remote system whereby applications write directly to a screen buffer associated with the host computer.

SUMMARY OF THE INVENTION

An object of the present invention is to provide a method for monitoring a system by searching a screen buffer (or frame buffer) readily applicable to IBM compatible devices without the configuration of any hardware on a server management board, and more particularly, by monitoring system messages written in the screen buffer of the system at the time of operation of a POST.

To accomplish the above object of the present invention, a device of the present invention includes steps of: reproducing the data of a screen buffer from the video RAM into a temporary buffer in a program; searching for particular BIOS messages in the temporary buffer reproduced from the data of the screen buffer; and reporting the BIOS messages found during the search to a remote system manager.

Further objects and advantage of the invention can be more fully understood from the following detailed description taken in conjunction with the accompanying drawings.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIG. 1 illustrates a mapping structure of a system memory of a general IBM PC compatible computer;

DETAILED DESCRIPTION OF THE INVENTION

FIG. 1 illustrates a mapping structure of a system memory. This mapping structure is used widely as the standard type. A screen buffer is an area among the 128 Kbyte area from 0XA0000 to 0XBFFFF. Areas after the screen buffer area have a slight difference according to each system manufacturer. However, the areas are address areas of a video memory used as a screen buffer by most IBM PC compatible systems.

When a system boots, a BIOS carries out a POST, and the BIOS outputs the POST result messages, in English, through a video card attached to each system and also outputs a POST code. When a system is turned on, you can see the messages, e.g., "SYSTEM RAM PASSED", "VIDEO BIOS SHADOWED", etc., displayed on a screen of a monitor.

These messages are stored as ASCII (American Standard Code for Information Interchange) code in an address area in which an actual text screen and a memory (screen buffer) correspond to each other one to one. Accordingly, the booting status of a system can be sensed by monitoring messages output to a screen buffer.

Messages output by the BIOS during the POST procedure and stored in the screen buffer are stored in a temporary buffer and then searched. Generally, a string search is used as a method of searching. When a special, or particular, message is detected, a code corresponding to the detected message is then stored, and then the temporary buffer is searched further to detect the presence of another special message.

After finishing the procedure of searching the temporary buffer for all the special messages, a server management board (SMB) waits for the next monitoring cycle and then continuously performs the same search as described above. When a preset monitoring time is completed, the SMB reports the booting status to a remote system manager through a predefined protocol by using the stored message codes. The foregoing will now be described with respect to FIG. 2.

Figure 2:
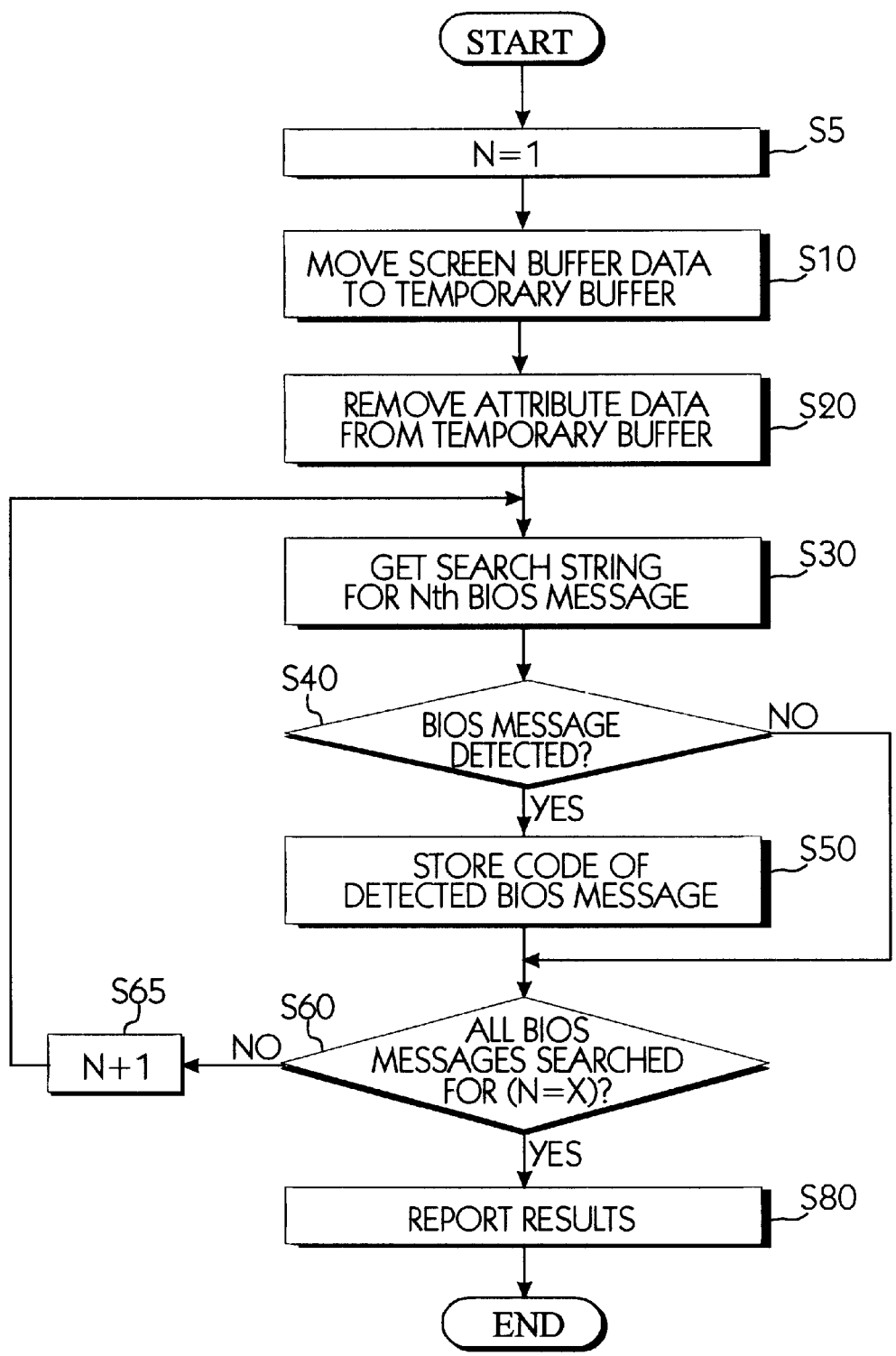
FIG. 2 is a flow chart showing a first embodiment of a method for monitoring a system by searching a screen buffer according to the present invention.

FIG. 2 is a flow chart illustrating a first embodiment of the method for monitoring a system by searching a screen buffer according to the present invention, as will be described below.

First of all, a variable N is set to 1 in step S2, then an area corresponding to one page of text is reproduced from the screen buffer area of video RAM area into a temporary buffer of a program in step S10. All unnecessary screen attribute data are then removed in step S20 and only the data corresponding to the system BIOS messages remain stored into the temporary buffer.

The BIOS messages, which were reproduced from the screen buffer and in the temporary buffer are searched to determine whether one or more specific BIOS messages are present. A method of searching is a string search method, which searches the stored BIOS messages in the firmware, i.e., temporary buffer, by using a function defined in the standard library of each programming language.

Accordingly, a search string for the Nth BIOS message is obtained in step S30 and then it is determined whether the Nth BIOS message (Nth search string) is detected in the temporary buffer in step S40. When it is determined that the Nth BIOS message is present in the temporary buffer, codes corresponding to the detected Nth BIOS message are stored in another storage area in step S50, and then it is checked to determine whether all of the specific message have been searched for in step S60. When it is determined that another specific message is to be searched for, the process goes to step S65 and increases the value of N by 1 an returns to step S30 to search the temporary buffer for the next specific BIOS message. When it is determined that the BIOS message searched for in step S40 is not present in the temporary buffer the process performs step S60. When it is determined that all the desired specific messages have been searched for in step S60, the search result is delivered to a remote system manager in step S80. At this time, a predefined protocol is used for delivering the result to the remote system manager. And the reported data may be the searched message code, and the message corresponding to each code can be directly transmitted by using the message code. Once the searched code is transmitted, the screen buffer monitoring process comes to an end.

Figure 3:
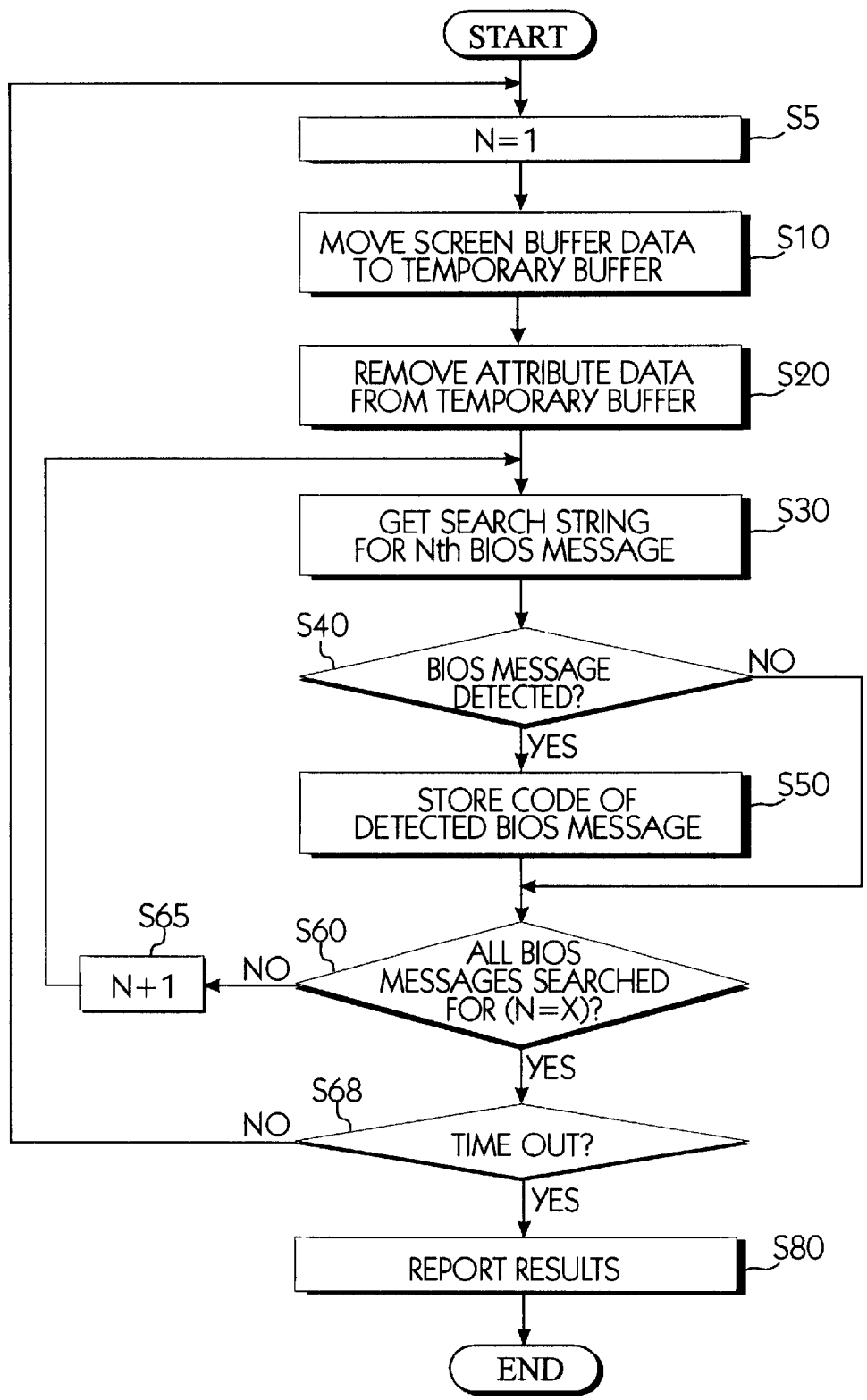
FIG. 3 art showing a second embodiment of a method for monitoring a system by searching a screen buffer according to the present invention.

The second embodiment shown in FIG. 3 is similar to the embodiment of FIG. 2 except that when it is determined that all the desired specific messages have been searched for in step S60, a monitoring timeout is checked in step S68. When it is determined that the monitoring time out has not been achieved, the process returns to step S2 to reset the value of N back to 1. As mentioned with respect to FIG. 2, an area corresponding to one page of text is reproduced from the screen buffer area of video RAM area into a temporary buffer of a program in step S10. Accordingly, the return loop enables another page of text to be stored in the temporary buffer in step S10 and the screen attribute data is removed therefrom in step S20. Then steps S30–S65 are repeated until step S60 again determines that all the specific BIOS messages have been searched for. When it is determined that the monitoring time out has been achieved in step S68, the search result is delivered to a remote system manager in step S80.

Figure 4:
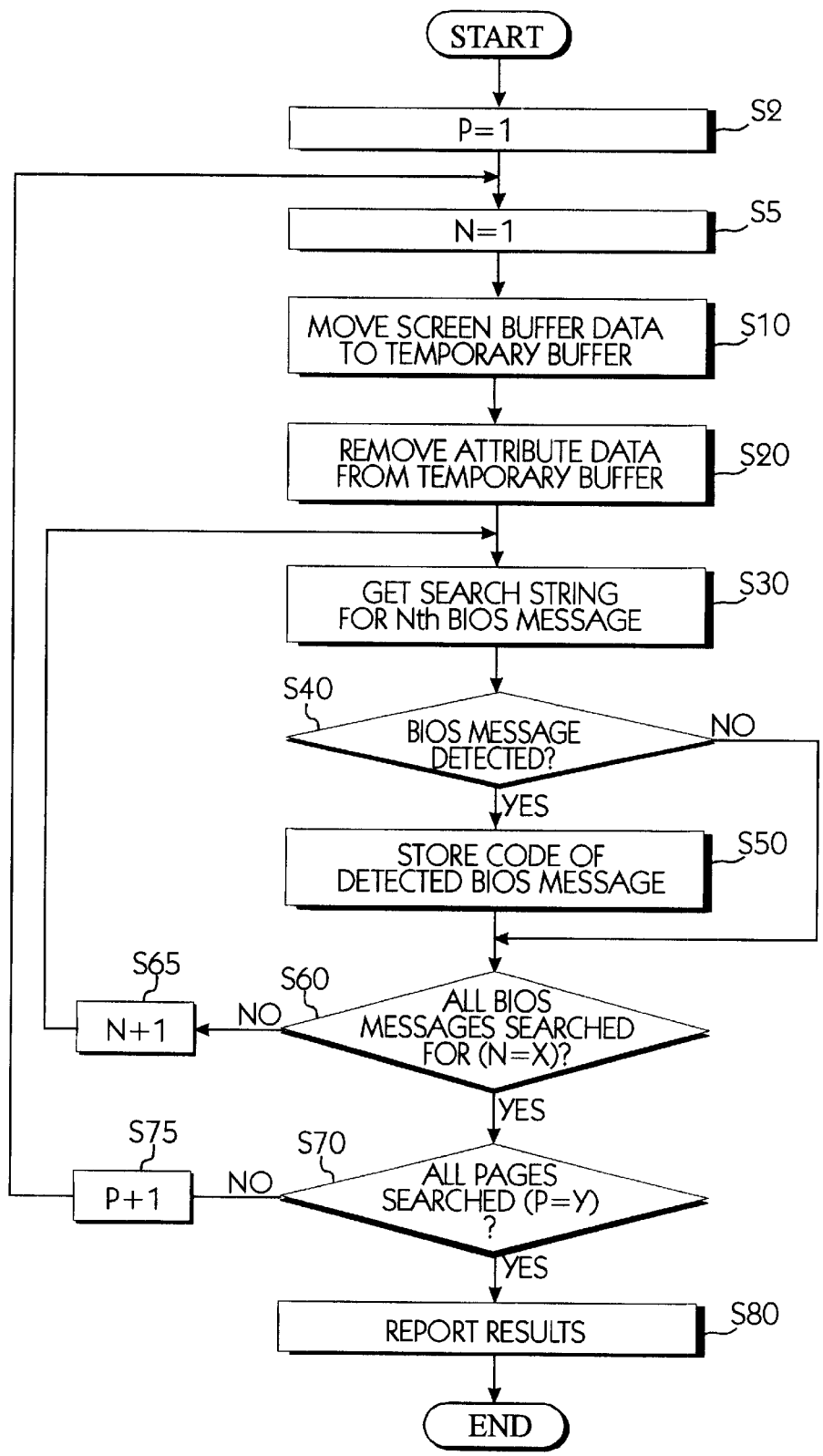
FIG. 4 is a flow chart showing a third embodiment of a method for monitoring a system by searching a screen buffer according to the present invention.

The third embodiment shown in FIG. 4 is to the second embodiment shown in FIG. 3 except instead of a single variable N being set to 1 in step S5 of FIG. 2, another variable P is also set to 1 in step S2. Additionally, when it is determined that all the desired specific messages have been searched for in step S60, it is checked to determine in step S70 whether all the pages of text to be stored in the temporary buffer have been searched, instead of the time out step S68 of FIG. 3.

Accordingly, when it is determined that all the pages have not been searched in step S70, the process goes to step S75 to increase the value of P by 1 and then returns to step S5 to reset the variable N to a value of 1. Then in step S10 another page of text is moved to the temporary buffer. As mentioned with respect to FIG. 2, an area corresponding to one page of text is reproduced from the screen buffer area of video RAM area into a temporary buffer of a program in step S10. Accordingly, the return loop enables another page of text to be stored in the temporary buffer in step S10 and the screen attribute data is removed therefrom in step S20. Then steps S30–S65 are repeated until step S60 again determines that all the specific BIOS messages have been searched for. When it is determined that all the pages have been searched in step S70, the search result is delivered to a remote system manager in step S80. The method described with respect to FIG. 4 result in all the pages of text being transferred to the temporary buffer from the screen buffer and searched, whereas, with respect to FIG. 3 the process may time out before all the pages of text have been transferred to the temporary buffer from the screen buffer.

As described above, the present invention provides a method for monitoring during boot time, which is applicable to any IBM PC compatible system without any hardware logic to be established inside of a server management board even if I/O terminals of POST codes are different according to a BIOS manufacturer and a system bus. Accordingly, the proceeding status of POST can be perceived without any hardware logic specially designed in the server management board. And a server management board can be manufactured which can manage the proceeding status even on a BIOS which does not support I/O terminals of POST codes for a PCI bus. Also, the device according to the present invention can inform a remote system manager of the more detailed data than a POST code indicated as hexadecimal by delivering system messages indicated as ASCII code.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for monitoring a system, comprising steps of:

reproducing data of a screen buffer in video memory into a temporary buffer;

searching for a specific BIOS message stored in the temporary buffer during said reproducing step; and reporting said specific BIOS message to a remote system manager when said searching step finds said specific BIOS message in said temporary buffer.

2. The method as set forth in claim 1, further comprising a step of removing all screen attribute data, included with said data reproduced during said reproducing step, from said temporary buffer prior to performing said searching step.

3. The method as set forth in claim 1, wherein said searching step comprises a step of obtaining a search string for said specific BIOS message by using functions defined in a standard libraries of a predetermined programming language.

4. The method as set forth in claim 1, wherein said step of reporting said BIOS message comprises a step of storing corresponding codes of the found BIOS message in another storage area and transmitting said codes to said remote system manager.

5. A method of monitoring a system, comprising steps of:

reproducing data from a screen buffer and storing the reproduced data into a temporary buffer;

removing all screen attribute data, included with said reproduced data, from said temporary buffer;

searching for a specific BIOS message stored in the temporary buffer during said reproducing step;

repeatedly performing said searching step until there are no more specific BIOS messages to be searched for; and reporting each said specific BIOS message found to a remote system manager when there are no more specific messages to be searched for.

6. The method as set forth in claim 5, further comprising a step of getting a search string corresponding to said specific BIOS message and using said search string to search for said specific BIOS message in said searching step.

7. The method as set forth in claim 5, wherein said step of repeatedly performing said searching step comprises steps of:

storing a code corresponding to said specific BIOS message in another buffer when said specific BIOS message is found during said searching step;

checking for a next specific BIOS message to be searched for; and returning to said searching step when it is determined that a next specific BIOS message is to be searched for and searching for said next specific BIOS message.

8. The method as set forth in claim 6, further comprising a step of:

initially setting a variable N to be equal to one prior to said reproducing step.

9. The method as set forth in claim 8, wherein said step of repeatedly performing said searching step comprises steps of:

storing a code corresponding to said specific BIOS message in another buffer when said specific BIOS message is found during said searching step;

determining whether all specific BIOS messages to be searched for have been searched for;

increasing said variable N by one when it is determined that not all of said specific BIOS messages have been searched for; and following said step of increasing, getting a search string corresponding to said next specific BIOS message and searching for said next specific BIOS message.

10. The method as set forth in claim 9, further comprising steps of:

determining whether a monitoring time has timed out, when it is determined that all of said specific BIOS messages have been searched for;

returning to said step of setting the variable N to be equal to one, when it is determined that the monitoring time has not timed out; and performing said reporting step when it is determined that said monitoring time has timed out.

11. A method of monitoring a system, comprising steps of:

setting a page variable P to be equal to 1;

setting a variable N to be equal to 1;

moving one page of text from a screen buffer into a temporary buffer;

removing all screen attribute data, included with said text, from said temporary buffer;

searching for a Nth specific BIOS message stored in the temporary buffer during said moving step;

determining whether all specific BIOS messages to be searched for have been searched for;

increasing said variable N by one and performing said searching step for a next specific BIOS message, when it is determined that not all of the specific BIOS messages to be searched for have been searched for; and reporting each specific BIOS message found to a remote system manager when it is determined that all of the specific BIOS messages to be searched for have been searched for.

12. The method as set forth in claim 11, further comprising a step of getting a search string corresponding to said Nth specific BIOS message and using said search string to search for said Nth specific BIOS message in said searching step.

13. The method as set forth in claim 11, further comprising a step of storing a code corresponding to each said found specific BIOS message in another buffer prior to performing said step of determining whether all specific BIOS messages to be searched for have been searched for, said code being transmitted to said remote system manager during said reporting step.

14. The method as set forth in claim 11, further comprising steps of:

determining whether all pages of text have been searched, when it is determined that all of the specific BIOS messages to be searched for have been searched for;

returning to said step of setting the variable N to be equal to one, when it is determined that all said pages of text have not been searched; and performing said reporting step when it is determined that all said pages of text have been searched.

* * * * *